(No Model.)
J. A. MARSH & G. B. HIGHT.
HOOP DRIVER AND FASTENER.
No. 548,213. Patented Oct. 22, 1895.
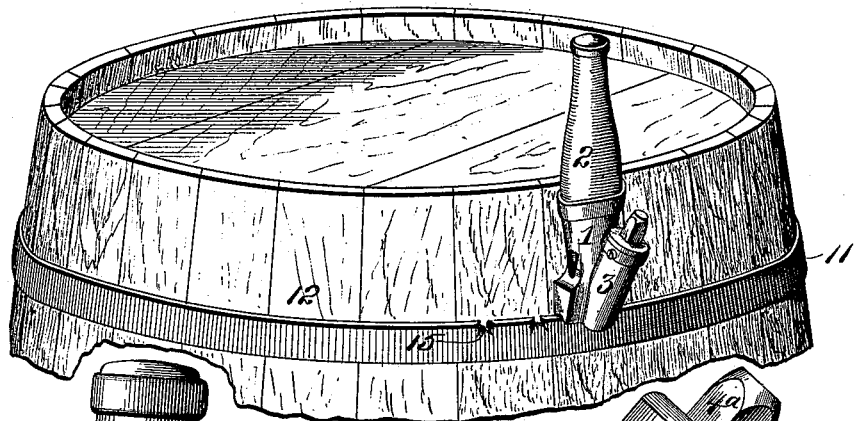
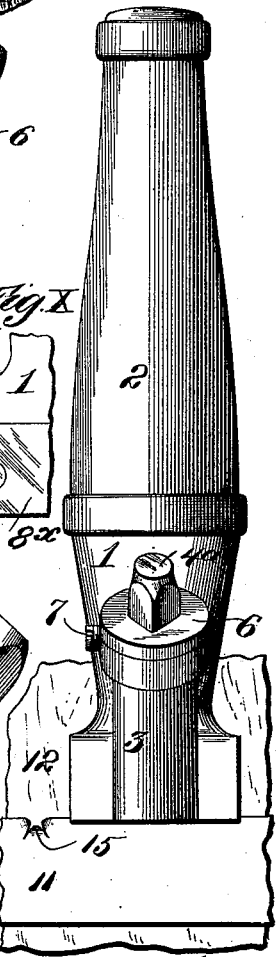
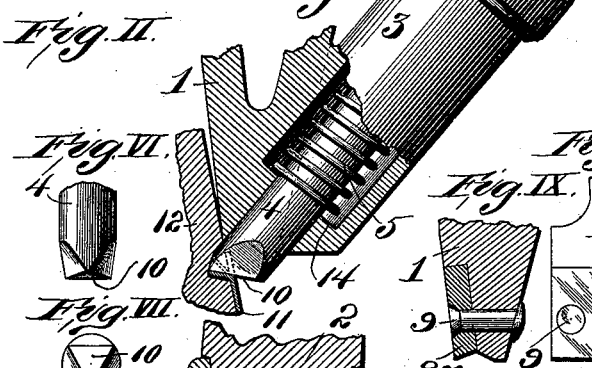
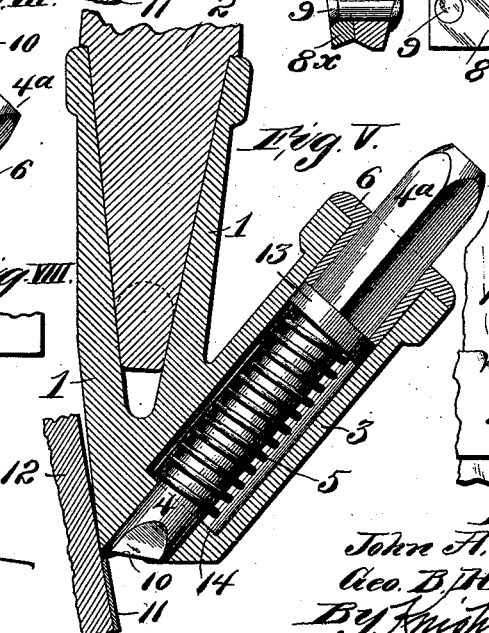
Inventors
John A. Marsh.
Geo. B. Hight.

UNITED STATES PATENT OFFICE.

JOHN A. MARSH AND GEORGE B. HIGHT, OF ST. LOUIS, MISSOURI.

HOOP DRIVER AND FASTENER.

SPECIFICATION forming part of Letters Patent No. 548,213, dated October 22, 1895.

Application filed December 13, 1894. Serial No. 531,631. (No model.)

*To all whom it may concern:*

Be it known that we, JOHN A. MARSH and GEORGE B. HIGHT, citizens of the United States, residing in the city of St. Louis, State of Missouri, have invented a new and useful Improvement in Hoop Drivers and Fasteners, of which the following is a specification.

Our invention relates to an instrument for driving hoops onto barrels, casks, &c., and the employment in said instrument of a punch, by which tangs may be formed from the hoop and pressed into the staves.

The object of our invention is to provide a tool to thus firmly secure the hoop to the vessel. We attain this object by means of an instrument illustrated in the accompanying drawings, in which—

Figure I illustrates in perspective the end of a barrel with the tool placed on a hoop thereof. Fig. II illustrates a side view of the tool. Fig. III illustrates a front view of the tool. Fig. IV illustrates a side view, part in section, of the punch and spring-cylinder, showing the punch depressed. Fig. V illustrates a vertical section of the tool, showing the punch in its normal position. Fig. VI illustrates a detail side view of the lower end of the punch. Fig. VII illustrates a detail end view of the same. Fig. VIII illustrates a detail rear view of the driving edge of the tool. Fig. IX illustrates a detail section of a modified form of the driving edge of the tool, the face thereof being a separate piece. Fig. X illustrates a rear view of a portion of said driving edge shown in Fig. IX.

The same numbers refer to the same or similar parts throughout the several figures.

1 is the main driver, cored to receive a wooden or other handle 2.

3 is a cylindrical holder, formed integral with and extending at an angle from said driver and adapted to contain the movable punch 4.

5 is a spiral spring.

6 is a circular flanged collar, provided with a square or other shaped opening that will prevent turning of the squared end $4^a$ of the punch and through which the punch 4 passes.

7 is a set-screw to fasten collar 6 in its place.

8 is the inner face of the driver.

10 is the end of the punch presented to the hoop.

11 is the hoop, and 12 the barrel-staves.

The tool consists of a main handle-driver, preferably made of cast-steel, but may be of wrought-iron, cast-iron, cast malleable iron, or brass with a cast-steel face-plate $8^x$, Fig. IX, fastened with screws or rivets 9 to its inner or driving edge. The main driver is cored to receive a handle, and its lower or driving edge is forged or ground out to fit the hoop to be fastened, and is curved or concaved on its inner side to fit against the barrel or vessel on which it is to be used. On the outer side and at the lower end of the driver is the punch and cylindrical holder 3, extending outwardly and upwardly at an angle of about forty degrees. Said cylindrical holder is made of suitable size to admit the spiral spring 5 and punch 4. The lower end of the holder contains a shoulder 14, against which said spring rests. The upper end of the cylinder is provided with a circular flanged collar 6, having an opening through its center to hold and guide the punch.

The punch 4 $4^a$ by means of which the hoop is fastened presents to the hoop two cutting-edges, which run back from an acute angle at the face to the rounded base, and is so placed that the point of the acute angle is on a line with the top of the hoop, Fig. V. The rear edge of the driver is cut out at $8^a$ to allow the punch to ride high enough to allow the cutting-point to come exactly onto the upper edge of the hoop. The punch, on the end of which these cutting-edges are made, is cylindrical at its lower end 4 to pass through the spiral spring in the spring-chamber. At the upper end $4^a$ it is square or other shape that will prevent the turning of the punch and passes through a collar 6, held in place by set-screws 7, which collar is made with an opening to fit the end $4^a$ of punch and serves as a guide to keep it in place and to prevent the cutting-point 10 from turning. Between the cylindrical end 4 and end $4^a$ is a circular collar 13, on the lower side of which the spring bears.

The tool being placed on the hoop the hoop is driven to position by striking on the main driver. Then without removing the tool a blow is struck on the end $4^a$. This forces the cutting-point of the punch onto the upper edge of the hoop and cuts the triangular tang 15, which is pressed into the material of the vessel and thus secures the hoop in place. As the tang 15 is formed it is driven directly into the stave by the end 10 of the punch, and at the same time there are also points of metal formed on either side of the tang by the sloping sides of the punch, and these points are carried part way into the stave, thereby giving additional security to the hoop.

What we claim as our invention is—

1. In a device for securing hoops to barrels, the combination of a driver for forcing a hoop into position, with a punch mounted thereon and having its working end presented at an angle to the working face of the driver, substantially as set forth.

2. In a combined hoop driver and fastener the combination of the driver for forcing a hoop into position, the punch holder formed integral with the driver, and the longitudinally movable punch supported in the holder with its working end presented at an angle to the working face of the driver, whereby a hoop can be punched and secured after it has been driven into position and while it is held by the driver, substantially as set forth.

3. In a combined hoop driver and fastener, the combination of the driver for forcing a hoop into position, the punch holder extending from the driver, the movable punch mounted in the holder and supported in proper relation to operate in conjunction with the driver, and a spring in the holder for keeping the punch in normally retracted position, substantially as set forth.

4. In a combined hoop driver and fastener, the combination of the driver, the cylindrical punch holder extending therefrom at an angle, a longitudinally movable punch mounted in said holder and supported thereby with its working end presented directly to the working face of the driver and at an angle thereto, and a spiral spring surrounding the punch and confined in the holder for retracting and holding the punch normally in retracted position, substantially as set forth.

5. In a combined hoop driver and fastener, the combination of the driver, the punch holder extending therefrom, and the movable punch carried by the holder in working relation to the driver and formed with a cutting point and two cutting edges, whereby a tang will be cut out of the hoop and forced into the barrel when the hoop is held by the driver and struck by the punch, substantially as set forth.

6. In a combined hoop driver and fastener the combination of the driver adapted to force the hoop to position, a cylindrical holder extending from the driver at an angle, a longitudinally movable punch mounted in said holder, a spiral spring surrounding the punch and confined between the bottom of the holder and a collar on the punch, and means for confining and guiding the punch in the holder, substantially as set forth.

7. In a combined hoop driver and fastener, the combination of the driver adapted to force the hoop to position, the cylindrical punch holder extending from the driver and formed with a large cylindrical bore and a smaller bore extending through the bottom, a longitudinally movable punch supported in the holder and having its lower end working in the smaller bore in the bottom, a spiral spring surrounding the punch and confined between the bottom and a collar on the punch, and means for holding the punch in the holder, substantially as set forth.

8. In a combined hoop driver and fastener, the combination of the driver adapted to force the hoop to position, a cylindrical holder formed on the driver and extending from it at an angle, said holder being formed with a large central bore and a smaller bore or opening through the bottom, a punch supported in said holder with its cutting end presented through the small opening in the bottom adjacent to the working face of the driver, a square or other angular upper end formed on the punch, a collar between the cylindrical portion and angular portion of the punch, a spiral spring surrounding the punch and confined between the bottom thereof and the collar on the punch, and a collar secured to the upper end of the holder and formed with a squared or other angular opening which fits over the angular upper end of the punch and holds it from turning in the holder, substantially as set forth.

JOHN A. MARSH.
GEO. B. HIGHT.

In presence of—
E. S. KNIGHT,
A. C. BROWN.